United States Patent
Srivastava et al.

(10) Patent No.: US 10,882,379 B2
(45) Date of Patent: Jan. 5, 2021

(54) HEATER CONTROL LOGIC IN TOW MODE

(71) Applicant: TOYOTA MOTOR ENGINEERING & MANUFACTURING NORTH AMERICA, INC., Plano, TX (US)

(72) Inventors: Abhishek Srivastava, Ann Arbor, MI (US); David W. Cosgrove, Milford, MI (US); Hidekazu Hirabayashi, Ann Arbor, MI (US); Akiyoshi B. Maeda, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 219 days.

(21) Appl. No.: 16/248,630

(22) Filed: Jan. 15, 2019

(65) Prior Publication Data
US 2020/0223288 A1    Jul. 16, 2020

(51) Int. Cl.
*B60H 1/00* (2006.01)
*F01N 5/02* (2006.01)
*B60H 1/03* (2006.01)

(52) U.S. Cl.
CPC ..... *B60H 1/00878* (2013.01); *B60H 1/00764* (2013.01); *B60H 1/034* (2013.01); *B60H 2001/00949* (2013.01)

(58) Field of Classification Search
None
See application file for complete search history.

(56) References Cited

U.S. PATENT DOCUMENTS

| | | | |
|---|---|---|---|
| 6,037,567 A * | 3/2000 | Inoue | B60H 1/2225 165/299 |
| 6,166,516 A | 12/2000 | Albright | |
| 7,028,767 B2 * | 4/2006 | Takano | B60H 1/00914 165/202 |
| 9,375,994 B2 * | 6/2016 | Eisenhour | B60H 1/2218 |
| 9,375,995 B2 | 6/2016 | Kim | |
| 9,637,052 B2 | 5/2017 | Whitehead | |
| 2001/0004090 A1 * | 6/2001 | Yamashita | B60H 1/00821 237/12 |
| 2011/0067389 A1 * | 3/2011 | Prior | B60H 1/025 60/320 |
| 2014/0223943 A1 | 8/2014 | Ichishi | |
| 2018/0086224 A1 | 3/2018 | King | |
| 2019/0009641 A1 * | 1/2019 | Jackson | B60H 1/00785 |

* cited by examiner

*Primary Examiner* — Redhwan K Mawari
*Assistant Examiner* — Melanie J Patrick
(74) *Attorney, Agent, or Firm* — Sheppard, Mullin, Richter & Hampton LLP; Hector A. Agdeppa; Daniel N. Yannuzzi

(57) ABSTRACT

System and methods are provided for improving fuel economy, and providing optimized operating conditions associated with a vehicle's air-conditioning system when the vehicle is carrying a load, e.g., towing a trailer. Operating conditions including, for example, air-mix setting, coolant temperature, ambient temperature, vehicle speed, and whether or not the vehicle is carrying the aforementioned load, may be considered when determining whether or not to activate or deactivate a vehicle heating element, such as a positive temperature coefficient (PTC) heater, steering wheel heater, etc.

17 Claims, 5 Drawing Sheets

HEATER CONTROL LOGIC IN TOW MODE

TECHNICAL FIELD

The present disclosure relates generally to controlling one or more vehicle heaters, and more particularly to controlling one or more vehicle heaters based on operating characteristics of the vehicle, e.g., when the vehicle is in tow mode, to optimize fuel economy and lessen the vehicle's operating load.

DESCRIPTION OF RELATED ART

Vehicles such as automobiles, may comprise, in part, an air-conditioning system. The air-conditioning system may include one or more ducts for feeding air to a vehicle cabin, a blower in the duct(s) for generating airflow towards the vehicle cabin, and a cooling device for cooling air passing through the duct(s). The air-conditioning system of the vehicle may also include a heater core, an air-mix damper, a water valve, and a control device for controlling the aforementioned components of the air-conditioning system.

BRIEF SUMMARY OF THE DISCLOSURE

In accordance with one embodiment, a method of controlling operation of a vehicle heater comprises determining whether a vehicle's air-conditioning system is on. If the vehicle's air-conditioning system is on, the method comprises determining whether an air-mix setting of the vehicle's air-conditioning system indicates a desire for maximum heat to be passed to the vehicle's cabin. If the air-mix setting indicates the desire for maximum heat to be passed to the vehicle's cabin, the method comprises determining whether the vehicle's coolant temperature is below a coolant temperature threshold. If the vehicle's coolant temperature is below the coolant temperature threshold, the method comprises determining whether an ambient temperature about the vehicle is below an ambient temperature threshold. If the ambient temperature is below the ambient temperature threshold, the method comprises determining whether the vehicle is moving. If the vehicle is moving, the method comprises determining whether the vehicle is carrying a load. If the vehicle is carrying a load, the method comprises activating the vehicle heater.

In some embodiments, the load comprises towed load, and determining whether the vehicle is carrying the load comprises at least one of sensing the presence of the towed load and determining that the vehicle is set to operate in a tow mode.

In some embodiments, the method further comprises deactivating the vehicle heater if the vehicle's air-conditioning system is off.

In some embodiments, the method further comprises deactivating the vehicle heater if the air-mix setting of the vehicle's air-conditioning system does not indicate a desire for maximum heat to be passed to the vehicle's cabin.

In some embodiments, the method further comprises deactivating the vehicle heater if the vehicle's coolant temperature is higher than the coolant temperature threshold.

In some embodiments, the method further comprises deactivating the vehicle heater if the ambient temperature is higher than the ambient temperature threshold.

In some embodiments, the method further comprises deactivating the vehicle heater if the vehicle is not moving.

In some embodiments, the method further comprises deactivating the vehicle heater if the vehicle is not carrying a load.

In some embodiments, the deactivation of the vehicle heater comprises overriding a default mode of operation of the vehicle heater.

In some embodiments, the vehicle heater comprises at least one of a positive temperature coefficient (PTC) heater, a vehicle seat heater, a steering wheel heater, a defroster, and a secondary heating element.

In accordance with another embodiment, an air-conditioning control device controlling an air-conditioning system of a vehicle comprises at least one processor, and at least one memory operatively connected to the at least one processor. The at least one memory includes computer code configured to cause the at least one processor to: receive from a plurality of vehicle sensors operatively connected to the air-conditioning control device and vehicle components, sensor data indicating operating conditions of the vehicle; and activate a heating element of the vehicle based on the sensor data, wherein the sensor data indicates that the air-conditioning system is on, a passenger of the vehicle is requesting maximum heat to be delivered to a cabin of the vehicle, coolant temperature does not exceed a coolant temperature threshold, ambient temperature does not exceed an ambient temperature threshold, the vehicle is moving, and the vehicle is towing a load.

In some embodiments, the computer code further causes the at least one processor to deactivate the heating element if the vehicle is operating in accordance with one or more of the following operating conditions: the air-conditioning system is off; the passenger of the vehicle is not requesting maximum heat to be delivered to the cabin of the vehicle; the coolant temperature exceeds the coolant temperature threshold; the ambient temperature exceeds an ambient temperature threshold; the vehicle is stationary; and the vehicle is not towing a load.

In some embodiments, the computer code causing the at least one processor to deactivate the heating element comprises computer code configured to cause the least one processor to override default operation of the heating element.

In some embodiments, the computer code causing the at least one processor to activate the heating element comprises computer code configured to cause the least one processor to override default operation of the heating element.

In some embodiments, the heating element comprises at least one of a positive temperature coefficient (PTC) heater, a vehicle seat heater, a steering wheel heater, a defroster, and a secondary heating element.

In some embodiments, the coolant temperature threshold comprises a temperature of approximately 45 degrees Celsius.

In some embodiments, the ambient temperature threshold comprises a temperature of approximately 5 degrees Celsius.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
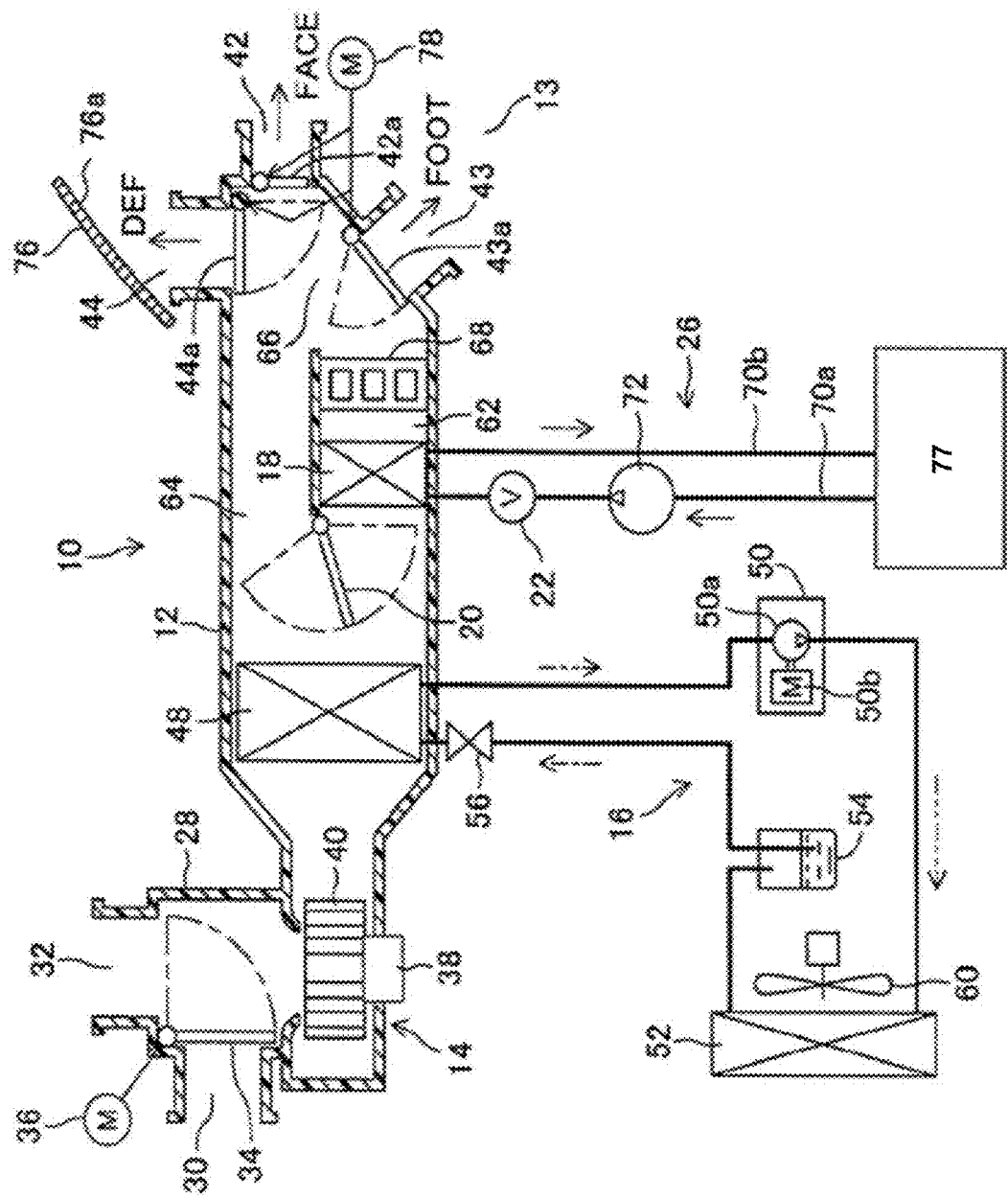
FIG. 1A is a schematic diagram of an example vehicle air-conditioning system in accordance with one embodiment of the present disclosure.

The figures are not exhaustive and do not limit the present disclosure to the precise form disclosed.

DETAILED DESCRIPTION

Various embodiments of the present disclosure are directed to controlling the operation of a vehicle heater or heating element, such as a positive temperature coefficient (PTC) heater used in the heater core, a steering wheel heater, a seat heating element, etc. Conventional PTC heater operation in a vehicle can be based on, e.g., heating, ventilation, and air-conditioning (HVAC) air-mix, water temperature, ambient temperature, and/or driving status (normal or eco). For example, PTC heater operation may be based on HVAC requests when the vehicle's operating conditions warrant PTC heater operation. If, for example, the engine of a vehicle is not warm enough to create heat, and the vehicle cabin is not warm enough, the PTC heater may be activated. However, conventional PTC heater operation fails to account for scenarios during which the vehicle may experience increased operating load due to certain operating conditions, e.g., when the vehicle is towing or otherwise carrying a load, such as a trailer.

Various embodiments control operation of a vehicle heater by deactivating or preventing operation of the vehicle heater, such as a PTC heater (considered to be a secondary heating element used to assist primary heater performance), when the vehicle is in tow mode. In tow mode, the increased operating load (e.g., engine load) allows for faster engine/vehicle cabin warmup. By deactivating or preventing activation of the PTC heater, the vehicle's electrical load can be reduced, fuel economy can be improved, and smaller alternators can be used in the vehicle, all while still having adequate engine/vehicle cabin warmup.

An air-conditioning system in accordance with various embodiments may condition and/or feed air into a vehicle cabin. An air-conditioning control device (which can be a separate control device or implemented as part of a vehicle's electronic control unit (ECU)) controls the air-conditioning system. In accordance with various embodiments, the air-conditioning control device may receive information from one or more vehicle sensors to determine the operating conditions of the vehicle. The one or more vehicle sensors may determine, e.g., whether or not various temperature parameters exceed thresholds, whether the vehicle is in a tow mode, etc. Based on the sensed operating conditions, the air-conditioning control device may control activation and deactivation of a PTC heater (or other vehicle heater). In some embodiments, the air-conditioning control device may be configured to control operation of the PTC (or other) heater directly. In other embodiments, the air-conditioning control device may be used to override or supersede conventional operation of the PTC (or other) heater.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1A is a schematic diagram of an example air-conditioning system 10 according to an embodiment of the present disclosure. The air-conditioning system 10 may include a duct 12 for feeding air to a vehicle cabin 13, a blower 14 disposed in the duct 12 for generating airflow toward the vehicle cabin 13, and a cooling device 16 for cooling air passing through the duct 12. Further, the air-conditioning system 10 may include a heater core 18, an air-mix damper 20, a water valve 22, and an air-conditioning control device 24 (shown in FIG. 1B). The air-conditioning control device 24 may be configured to control blower 14, cooling device 16, air-mix damper 20, water valve 22, and the like, as described in greater detail below.

The heater core 18 may be implemented in duct 12 on a downstream side of the airflow with respect to an evaporator 48 of cooling device 16, and is configured to use an engine coolant supplied by a coolant circulation system 26. The engine coolant may be used as a heat source for heating air passing through duct 12 into vehicle cabin 13. The air-mix damper 20 may be implemented on an upstream side of the airflow with respect to the heater core 18 in duct 12. Air-mix damper 20 may be configured to change a ratio between an amount of air passing through the heater core 18 and an amount of air bypassing the heater core 18 by changing the degree to which air-mix damper 20 is opened.

Water valve 22 is provided in coolant circulation system 26 on an upstream side with respect to heater core 18 in terms of coolant flow (indicated by the solid arrows in FIG. 1A). Water valve 22 may be configured to decrease the amount by which it is opened depending on necessity, thereby decreasing the amount of coolant supplied to the heater core 18, or even stopping the flow of coolant.

Duct 12 includes an interior/exterior air switching box 28 on an upstream side of the airflow with respect to blower 14 for switching the air to be introduced into duct 12. The air to be introduced may be interior air (air in the vehicle cabin 13, also referred to as recirculated air) and exterior air (air outside the vehicle cabin 13). An interior air opening 30 for introducing interior air into duct 12, and an exterior air opening 32 for introducing exterior air into duct 12 are provided for interior/exterior air switching box 28. Furthermore, an interior/exterior air switching door 34 may be arranged inside the interior/exterior air switching box 28. Interior/exterior air switching door 34 may be used to adjust (e.g., continuously) interior air opening 30 and exterior air opening 32 simultaneously. Doing this can change an exterior air introduction ratio, which is a ratio of the exterior air to the entirety of air to be introduced into duct 12 from interior air opening 30 and the exterior air opening 32. Interior/exterior air switching door 34 may be driven by actuator 36. Actuator 36 may be controlled by air-conditioning control device 24.

A mode of introducing interior/exterior air by way of interior/exterior air switching box 28 is also referred to as inlet opening mode. The inlet opening mode includes an interior air mode (recirculate), an exterior air mode (fresh), and a semi-interior air mode. In the interior air mode, when interior air opening 30 is fully opened, the exterior air opening 32 is fully closed, interior or recirculated air may be introduced into duct 12. In the exterior air mode, when the interior air opening 30 is fully closed, and the exterior air opening 32 is fully opened, exterior or fresh air may be introduced into duct 12. In the semi-interior air mode, the amount by which interior air opening 30 and exterior air opening 32 are opened may be approximately the same. In this way, exterior air and interior air may be introduced into duct 12 in equal or similar amounts.

Blower 14 can be an electric air delivery device that includes a blower motor 38 and a centrifugal multi-wing fan (sirocco fan) 40 driven by blower motor 38. Blower 14 may be configured to blow air-conditioned air whose temperature is adjusted using air outlet openings 42 to 44 into vehicle cabin 13 and formed on duct 12. A rotational speed, which corresponds to the amount of air output by blower motor 38, is controlled by air-conditioning control device 24.

The cooling device 16 includes, for example, an evaporator 48, a compressor 50, a condenser 52, a gas-liquid separator 54, and an expansion valve 56. The evaporator 48 is arranged on a downstream side of the airflow with respect to blower 14. The evaporator 48 is configured to evaporate a refrigerant, which has been expanded by expansion valve 56 after compression by the compressor 50. Evaporator 48 further performs a heat exchange between the refrigerant (decreased in temperature by evaporation) and air passing through the evaporator 48, thereby cooling the air. In FIG. 1A, the long dashed short dashed arrow represents a flow of the liquid refrigerant to/from evaporator 48, and the long dashed double-short dashed arrow represents a flow of the gas refrigerant to condenser 52.

The compressor 50 is arranged in an engine room (not shown) and is configured to suck in and then compress the gas refrigerant, and discharge the gas refrigerant at a high pressure. The compressor 50 may be an electric compressor in which a fixed displacement type compression mechanism 50a whose discharge volume is fixed is driven by an electric motor 50b. The electric motor 50b may be an AC motor whose rotational speed is controlled by an AC voltage output from an inverter 58 (see FIG. 1B). The inverter 58 is controlled by the air-conditioning control device 24.

The condenser 52 may also be arranged in the engine room, and is configured to carry out heat exchange between the refrigerant circulating inside and the exterior air delivered by a blower fan 60 serving as an exterior blower, thereby liquefying the compressed refrigerant through condensation. The blower fan 60 is an electric blower whose availability, namely, a rotational speed (air delivery amount) is controlled by a control voltage output from the air-conditioning control device 24.

The air/liquid separator 54 is configured to apply air/liquid separation to the refrigerant liquefied by the condensation, and cause only the liquid refrigerant to flow to the expansion valve 56. The expansion valve 56 is a decompressing device for decompressing the liquid refrigerant to expand the refrigerant, and is configured to supply the decompressed and expanded refrigerant to the evaporator 48.

A heating passage 62 and a cool air bypass passage 64 for causing the air having passed through the evaporator 48 to flow, and a mixing space 66 for mixing the air having passed those passages are formed on the downstream side of the airflow with respect to the evaporator 48 in the duct 12. A heater core 18 and a PTC heater 68 serving as a heating device for heating the air that has passed through the evaporator 48 (i.e., the air that has been cooled by the evaporator 48) are arranged in this sequence along the direction of the flow of the air in the heating passage 62.

The heater core 18 is a heat exchanger for heating the air that has passed through the evaporator 48 through heat exchange between a coolant (hot coolant) of an engine 77 for outputting a driving force for vehicle travel and the air that has passed through the evaporator 48. Specifically, a coolant flow passage for supply 70a and a coolant flow passage for return 70b connect the heater core 18 and the engine 77 to each other. The electric water pump 72 and the water valve 22 are provided in the coolant flow passage for supply 70a. The coolant flow passages 70a and 70b, the electric water pump 72, and the water valve 22 cooperate with, for example, a coolant passage (not shown) in the engine 77, thereby forming coolant circulation system 26 for circulating the coolant between the heater core 18 and the engine 77.

Water pump 72 may be an electric water pump whose rotational speed (which correlates to the circulation flow amount of coolant) is controlled by a control voltage output from the air-conditioning control device 24. The water valve 22 is an electromagnetic valve for normally maintaining an open state, and the amount by which it may be opened is controlled by a control current output from the air-conditioning control device 24. When the amount by which the opening of water valve 22 is decreased, the amount of coolant flowing to the heater core 18 is decreased, also decreasing the thermal energy supplied to the heater core 18. When the water valve 22 is to be closed in a state where water pump 72 is driven, water pump 72 is stopped when water valve 22 is closed.

Moreover, PTC heater 68 may include a plurality of PTC devices, and as alluded to above, may be an electric heater used an auxiliary heating element(s)/mechanism(s) for generating heat as a result of supplying electric power to the PTC devices. This in turn, heats the air passing through the heater core 18. Air-conditioning control device 24 is configured to change the number of PTC devices to which the current is supplied through switching or the like, thereby controlling a heating performance of the entire PTC heater 68.

The cool air bypass passage 64 is an air passage configured to lead the air that has passed through evaporator 48 to the mixing space 66 without passing through the heater core 18 and the PTC heater 68. Thus, the temperature of the air mixed in the mixing space 66 changes depending on the ratio of the air passing through the heating passage 62 and the air passing through the cool air bypass passage 64.

Air-mix damper 20 is provided on an inlet side of the heating passage 62 and the cool air bypass passage 64, and is configured to (e.g., continuously) change the ratio of the cool air flowing into the heating passage 62 and the cool air flowing into the cool air bypass passage 64. The air-mix damper 20 is driven by an (electric) actuator (36), and this actuator is controlled by a control signal output from the air-conditioning control device 24. The air mix damper 20 functions as a temperature adjustment device for adjusting the temperature (temperature of the delivered air supplied to the vehicle cabin 13) of the air in the mixing space 66.

The air outlet openings 42 to 44 are positioned at a furthest downstream portion of the airflow flowing through the duct 12, and are configured to blow out the delivered air whose temperature is adjusted from the mixing space 66 to the vehicle cabin 13, which is a space to be air-conditioned. The air outlet opening 42 is a face outlet opening for blowing the air-conditioned air to an upper body of a passenger (not shown) in the vehicle cabin 13. The air outlet opening 43 is a foot outlet opening for blowing the air-conditioned air to the feet of the passenger. The air outlet opening 44 is a defroster outlet opening for blowing the air-conditioned air to an inner surface 76*a* of a front windshield 76.

A face door 42*a* adjusts an opening area of the air outlet opening 42, a foot door 43*a* adjusts an opening area of the air outlet opening 43, and a defroster door 44*a* adjusts an opening area of the air outlet opening 44. Face door 42*a*, air outlet opening 42, foot door 43*a*, and defroster door 44*a* are respectively arranged on an upstream side of the airflow with respect to the air outlet openings 42 to 44. The face door 42*a*, the foot door 43*a*, and the defroster door 44*a* are coupled to an electric actuator 78 for controlling operation of the doors via a link mechanism (not shown), and are driven pivotally in cooperation with one another. The electric actuator 78 is also controlled by a control signal output from the air-conditioning control device 24. The air outlet openings 42 to 44 and the electric actuator 78 function as outlet opening adjustment devices for respectively adjusting the opening areas of the respective air outlet openings 42 to 44.

Various outlet opening modes can be provisioned through settings of the air outlet openings 42 to 44. The outlet opening modes available for the setting include a face mode (FACE), bi-level mode (B/L), a foot mode (FOOT), a defroster mode (DEF), and a foot/defroster mode (F/D).

The face mode is a mode for fully opening the face outlet opening 42, thereby blowing the air from the face outlet opening 42 toward the upper body of the passenger in the vehicle cabin 13. The bi-level mode is a mode for opening both the face outlet opening 42 and the foot outlet opening 43, thereby blowing air toward the upper body and the feet of the passenger in the vehicle cabin 13. The foot mode is a mode for fully opening the foot outlet opening 43, and opening the defroster outlet opening 44 to smaller degree, thereby blowing out air mainly from the foot outlet opening 43. The defroster mode is a mode for fully opening the defroster outlet opening 44, thereby blowing out air from the defroster outlet opening 44. The foot/defroster mode is a mode for opening the foot outlet opening 43 and the defroster outlet opening 44 to approximately the same opening degree, thereby blowing out air from both foot outlet opening 43 and defroster opening 44.

Figure 1B:
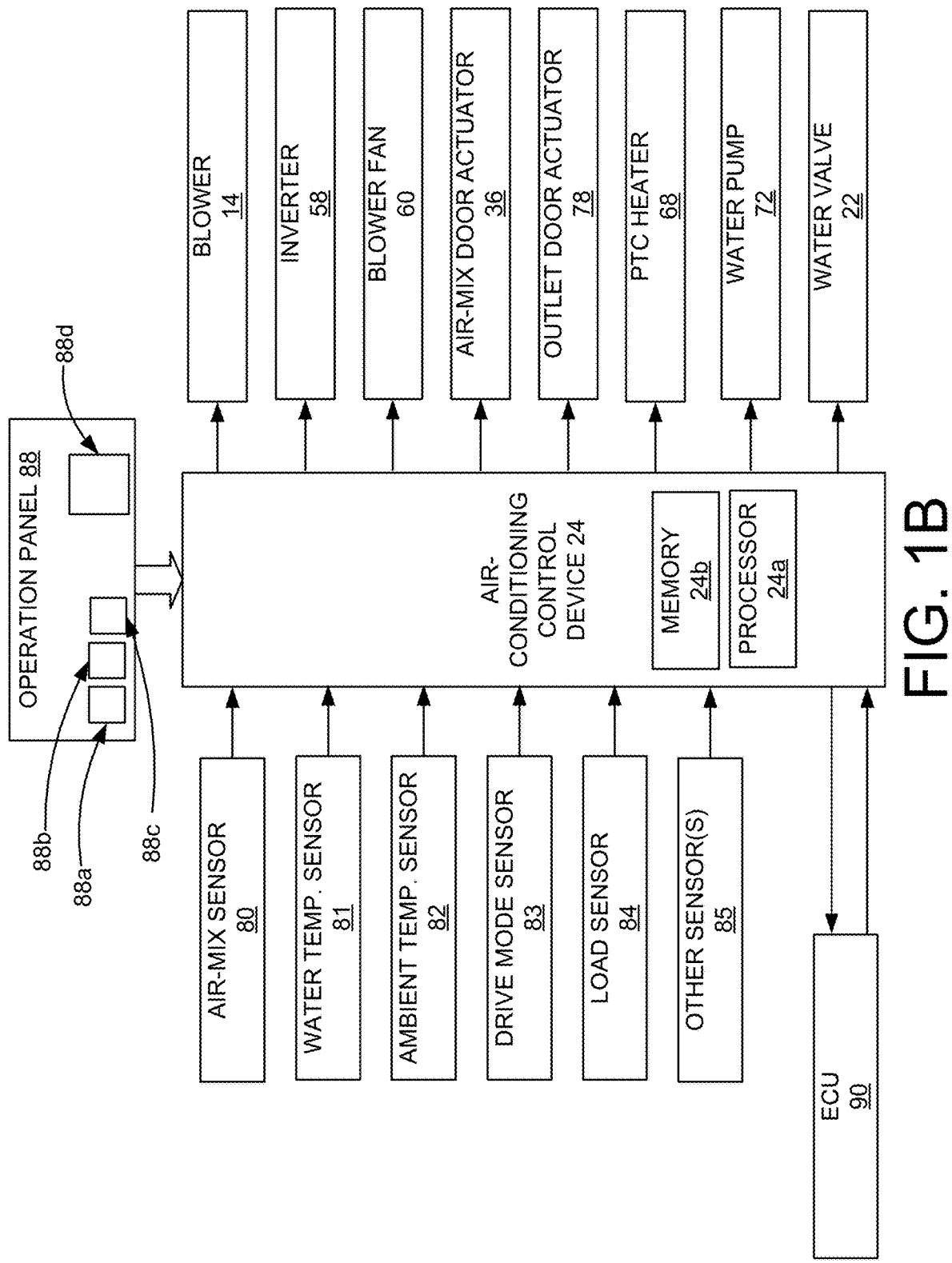
FIG. 1B is a schematic diagram of an example air-conditioning control system in accordance with one embodiment of the present disclosure.

With reference to FIG. 1B, a description is now given of a control system according to one embodiment. The air-conditioning control device 24 may be configured to include a processor 24*a*, such as a central processing unit (CPU), operatively connected to a memory 24*b*, such as read-only memory (ROM), and/or random access memory (RAM). Air-conditioning control device 24 may be configured to carry out various types of calculations and perform various processes based on an air-conditioning program(s) and/or algorithm(s) stored in memory 24*b*. These air-conditioning programs and/or algorithms may control the operation of the output-side devices.

As illustrated in FIG. 1B, certain above-described components may be connected to an output side of air-conditioning control device 24 including, but not necessarily limited to the following: blower 14, inverter 58 for the electric motor 50*b* of compressor 50, blower fan 60 as an exterior fan, electric actuator (air-mix door actuator) 36 for interior/exterior air switching door 34, electric actuator 78 for (outlet opening) doors 42*a*, 43*a*, and 44*a* for switching the outlet opening mode, PTC heater 68, electric water pump 72, and water valve 22.

An air-mix sensor 80 for detecting the air-mix directed into vehicle cabin 13 and controlled by air-mix door actuator 36 may transmit signals indicative of the sensed air-mix to air-conditioning control device 24. A water/coolant temperature sensor 81 determines the temperature of the water/coolant passing through coolant circulation system 26 and signals data indicative of this temperature to air-conditioning control device 24. An ambient temperature sensor 82 may detect the temperature outside of vehicle cabin 13. A drive mode sensor 83 may determine whether the vehicle is operating in tow mode, and transmit signals indicative of it mode of operation to air-conditioning control device 24.

It should be understood that different methods can be used for detecting whether or not a vehicle is towing or carrying some load that may impact operation of PTC (or other heating component/element) heater 68. For example, as noted above, an operator of a vehicle may actuate a button or other indicator or switch indicating the vehicle is to be operated in tow mode. Alternatively, or in addition, a load sensor 84 or other sensors 85, e.g., cameras, proximity sensors, etc. may be used as alternative or in some combination to detect the presence of a load, e.g., a trailer, road load of the vehicle, etc. For example a pressure sensor located at a hitch of a vehicle may be used to sense pressure, presumably imparted by the force of a trailer coupler socket on the hitch. As another example, a camera may be used to detect the presence of a trailer behind the vehicle. Other examples of trailer or load detection may be found in commonly-assigned U.S. patent application Ser. No. 15/836,026, incorporated herein by reference in its entirety. It should be understood that carried loads, besides loads that are towed, may be great enough to have an impact on PTC heater (or other heater) operation as disclosed herein. That is, a vehicle, such as a truck having a truck bed carrying a substantial load, which may force the engine 77 of the vehicle to operate at a level such that enough heat may be generated by engine 77 to offset the need to activate or maintain activation of PTC heater 68.

Further, operating signals are input from various air-conditioning operating switches provided on an operation panel 88 arranged near an instrument panel (e.g., at a front portion of the vehicle cabin 13, not shown) to the input side of air-conditioning control device 24. The various air-conditioning operating switches may be operated by a passenger and/or operator of the vehicle.

Operation panel 88 may include, but is not limited to, an air-conditioner switch 88*a* for turning on/off the air-conditioner (specifically, compressor 50), an auto switch 88*b*, and a switch (not shown) for switching the operation mode are provided as the various air-conditioning operating switches on operation panel 88. Further, an inlet opening mode switch 88*c* for switching the inlet opening mode, an outlet opening mode switch (not shown) for switching the outlet opening mode, an air amount setting switch (not shown) for the blower 14, a vehicle cabin temperature setting switch (not shown) for setting a target temperature in the vehicle cabin 13, and the like are provided on the operation panel 88. The auto switch 88*b* is a switch used to set or reset automatic control for the air-conditioning system 10.

As illustrated in FIG. 1B, a display 88*d* may be used to display the operating state of the air-conditioning system 10. Display 88*d* may be provided on the operation panel 88. The inlet opening mode selected by the inlet opening mode switch 88*c* and the like may also be displayed on the display 88*d*.

As further illustrated in FIG. 1B, the air-conditioning control device 24 is electrically connected to an engine control device, such as an electronic control unit (ECU) 90. ECU 90 may control operation of engine 77, and air-conditioning control device 24 and ECU 90 may be configured to transmit/receive information to/from each other. Thus, based on a detection signal or an operation signal input to one of the control devices, another control device can control operations of various devices connected to an output side thereof.

Figure 2:
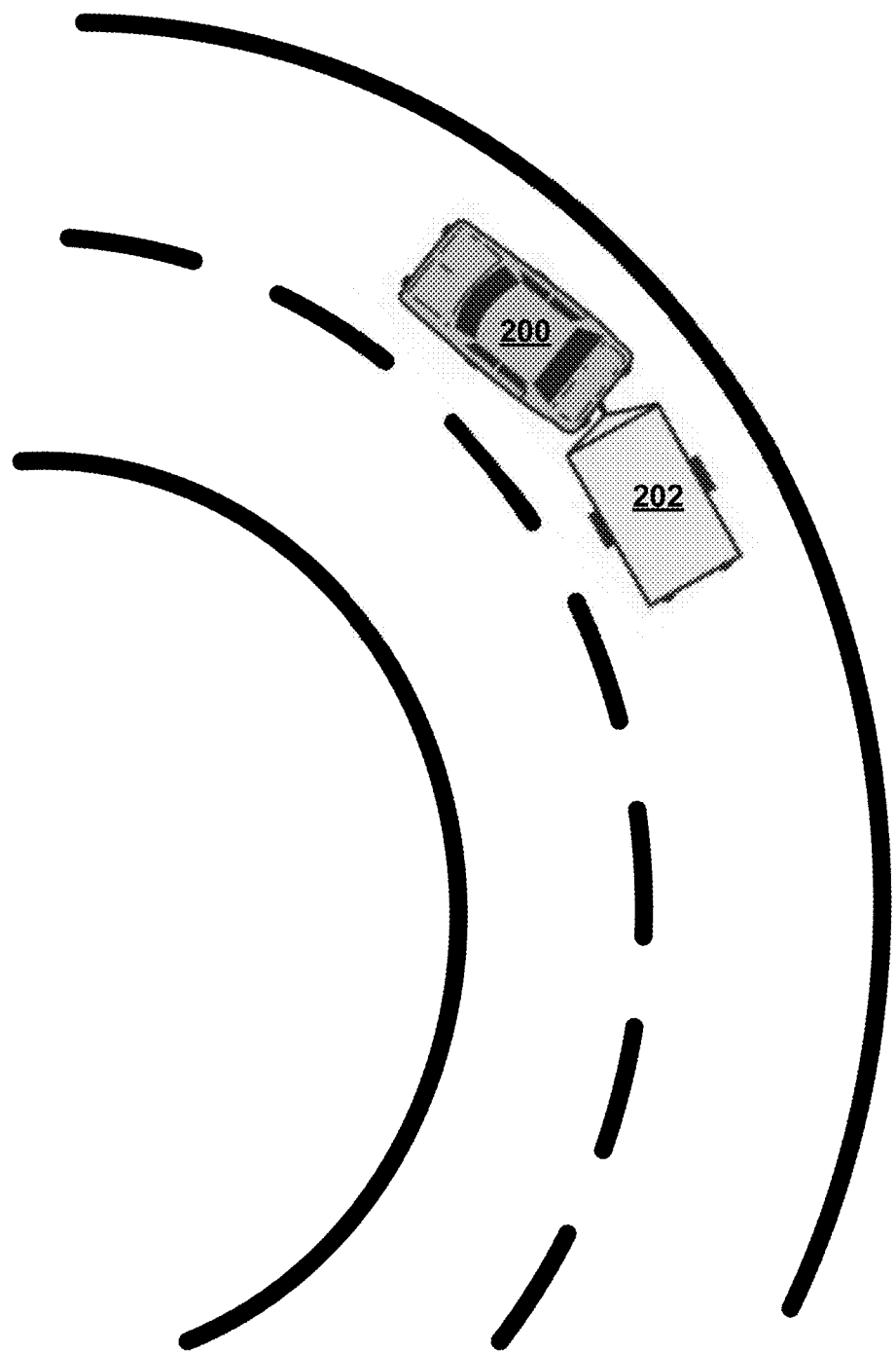
FIG. 2 illustrates an example towing scenario during which various embodiments may be used.

As noted above, various embodiments are directed to deactivating or altering, e.g., a default mode of operation of PTC heater 68 when certain conditions exist that may make operation of PTC heater 68 unnecessary. FIG. 2 illustrates an example scenario during which PTC heater 68 may be deactivated. For example, when a vehicle 200 (an embodiment of a vehicle in which air-conditioning system 10 may be implemented) is in tow mode or otherwise carrying a load, PTC heater 68 may be deactivated. This is because the increased load on engine 77 needed to tow the load (e.g., trailer 202) results in engine 77 operating in a manner that generates additional heat. The additional heat generated by engine 77 when in tow mode, can be used to heat vehicle cabin 13 and/or engine 77 itself, negating the need to activate PTC heater 68.

Figure 3:
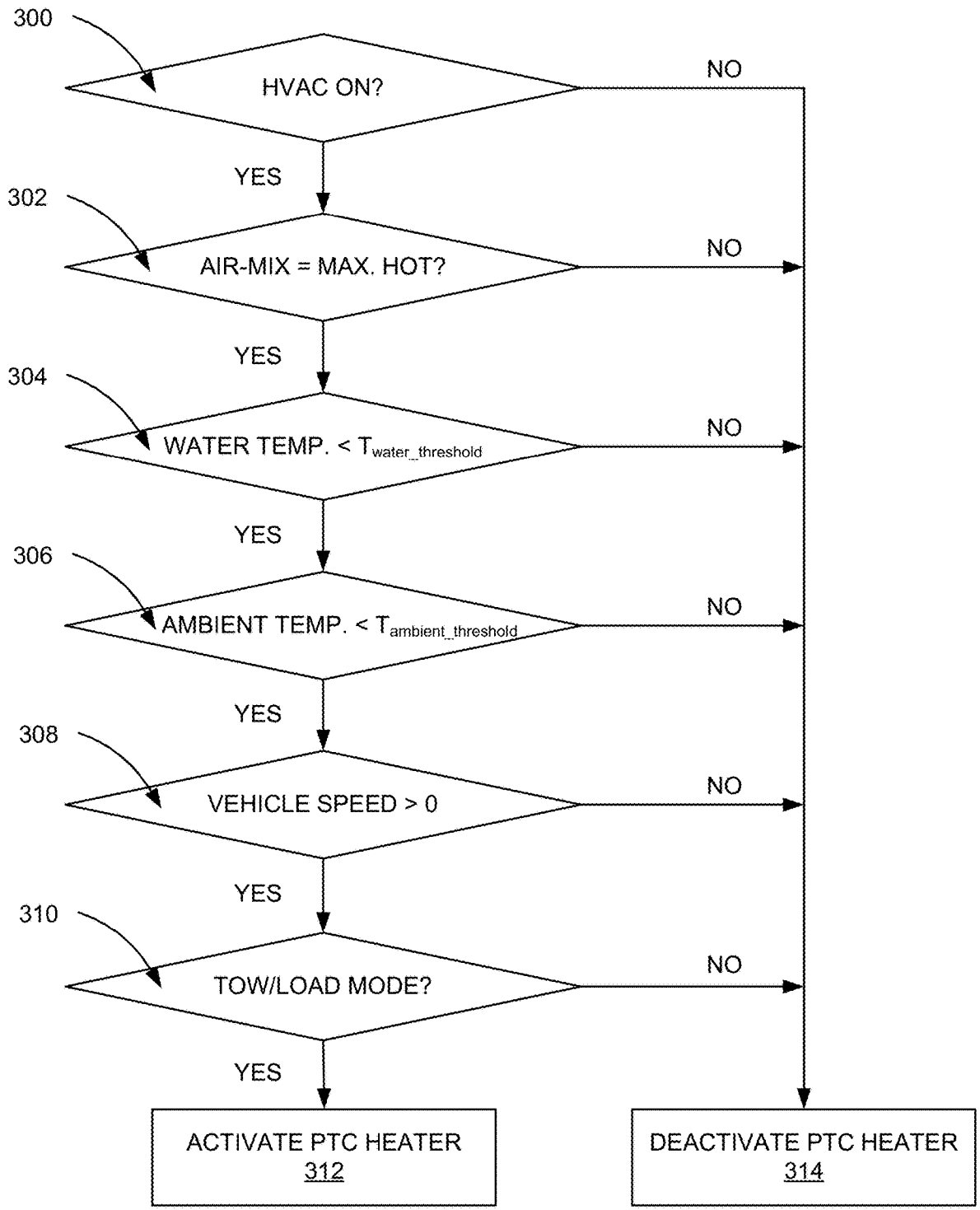
FIG. 3 illustrates example processes that may be performed for controlling a PTC heater in accordance with one embodiment of the present disclosure.

FIG. 3 illustrates example operations that can be performed to control operation of a heater, e.g., a PTC heater of a vehicle, a seat heater, a steering wheel heater, rear defroster, etc. At operation 300, a check is performed, e.g., by ECU 90, or by air-conditioning control device 24, to determine whether air-conditioning system 10 is on/operative. ECU 90 or air-conditioning control device 24 may monitor operation panel 88 to determine if any of the requisite switches are on, for example. Additionally, air-conditioning control device 24 or ECU 90 may monitor any one or more of the components of air-conditioning system 10, e.g., blower 14, inverter 58, blower fan 60, etc. If any one or more of these components of air-conditioning system 10 are on/operating, ECU 90 or air-conditioning control device 24 may determine that air-conditioning system 10 (or some HVAC aspect thereof) is on. If air-conditioning system 10 is off, PTC heater 68 may be deactivated at operation 314, i.e., air-conditioning control device 24 may transmit a signal or instruction (or adjust some operating current/voltage) to deactivate PTC heater 68. It should be understood that if there is no need to air-conditioning, and the air-conditioning system 10 is not active, there is likely not a reason for PTC heater 68 to be on, thereby reducing the electrical load on the vehicle.

As noted above, activation and deactivation of PTC heater 68 (or other heating element) may be performed by way of air-conditioning control device 24 and/or ECU 90 (operating in conjunction with air-conditioning control device 24) altering a default mode of operation. That is, air-conditioning control device 24 may control operation of air-conditioning system 10 (which includes PTC heater 68) in accordance with one or more existing algorithms or instructions corresponding to one or more existing algorithms stored in memory 24b. In other words, upon a determination that PTC heater 68 should be deactivated, air-conditioning control device 24 or ECU 90 may override default operation of PTC heater 68. In some embodiments, the method of FIG. 3 may represent an algorithm that can be implemented and executed by air-conditioning control device 24 or ECU 90 to control operation of PTC heater 68.

At operation 302, a check may be performed, e.g., by ECU 90, or by air-conditioning control device 24, to determine whether the air-mix corresponds with a maximum heat setting. ECU 90 or air-conditioning control device 24 may receive sensor data from air-mix sensor 80 indicative of a current air-mix setting desired by a passenger or operator of the vehicle. When the air-mix corresponds to a maximum heat setting, it suggests that the passenger/operator is trying to put as much heat as possible in vehicle cabin 13. Accordingly, this check is performed to determine if PTC heater operation is warranted. If the air-mix setting corresponds to a maximum heat setting, the method continues with another check (of water temperature) described below. If the air-mix setting does not correspond to a maximum heat setting, PTC heater 68 may again be deactivated at operation 314.

At operation 304, a check may be performed, e.g., by ECU 90, or by air-conditioning control device 24, to determine the temperature of the water/coolant being passed through coolant circulation system 26. If the temperature of the water/coolant is below a determined water/coolant temperature threshold, e.g., approximately 45° C., the process continues with a check of the ambient temperature, described in greater detail below. However, if the temperature is higher than the determined water/coolant temperature threshold, PTC heater 68 is deactivated at operation 314. It should be understood that low water/coolant temperature is generally indicative of an operating condition where the engine 77 is still cold/cool, and generally, heating vehicle cabin 13 is accomplished by way of water/coolant passing through heater core 18 (which PTC heater 68 helps to heat). It should also be understood that the water/coolant temperature threshold may vary.

At operation 306, a check may be performed, e.g., by ECU 90, or by air-conditioning control device 24, to determine the ambient temperature about the vehicle/vehicle cabin 13. If the ambient temperature is below a determined ambient temperature threshold, e.g., approximately 5° C., the process continues with a check of vehicle speed, described in greater detail below. However, if the ambient temperature is higher than the determined ambient temperature threshold, PTC heater 68 is deactivated at operation 314. It should be understood that low ambient temperature can act as a trigger or indicator to ensure that the temperature outside the vehicle/vehicle cabin 13 is cold enough that heat assistance by way of PTC heater 68 is warranted.

At operation 308, a check may be performed, e.g., by ECU 90 or by air-conditioning control device 24, to determine if the vehicle is moving, e.g., if the vehicle speed is greater than 0 mph/kph. If the vehicle is moving, PTC heater 68 may be deactivated at operation 314 because engine 77 is running and can generate heat. If the vehicle is not moving, yet another check may be performed to determine if the vehicle is in a tow mode/is hauling a load, described in greater detail below.

At operation 310, a check may be performed, e.g., by ECU 90 or by air-conditioning control device 24, to determine if the vehicle is in a tow mode/is hauling some load that may warrant deactivation of PTC heater 68. In particular, as described above, a variety of methods may be used to determine if a vehicle is towing or otherwise hauling a load, e.g., a trailer. In some embodiments, the vehicle may be set to operate in a tow mode, wherein determining whether the vehicle is in a tow mode may comprise monitoring the state of operation of the vehicle or monitoring the state of a tow mode setting (e.g., user-selectable or automatically-selectable tow mode setting). It should be understood that PTC heaters are generally considered to be wasteful heating elements inasmuch as it is only used to heat vehicle cable 13. For example, in conventional vehicles, the use of PTC heaters in normal/eco mode is avoided when possible. However, tow/load conditions are not considered in conventional vehicles. This is despite the fact that when a vehicle is towing/hauling some load, the shift map generally changes, the load on the engine is greater (meaning the engine and vehicle cabin will warm up faster), and with the additional load, it is desirable to reduce any unnecessary electrical load to increase tow capacity. Thus, if it is determined that the vehicle is towing/hauling a load, in conjunction with the aforementioned determinations, PTC heater 68 may be activated at operation 312. In some embodiments, as noted above, there may be existing/default algorithms or instructions upon which operation of PTC heater 68 may be based. Accordingly, in some embodiments, operation 312 may correspond to activating that default or existing PTC heater control, e.g., allowing it be activated.

Figure 4:
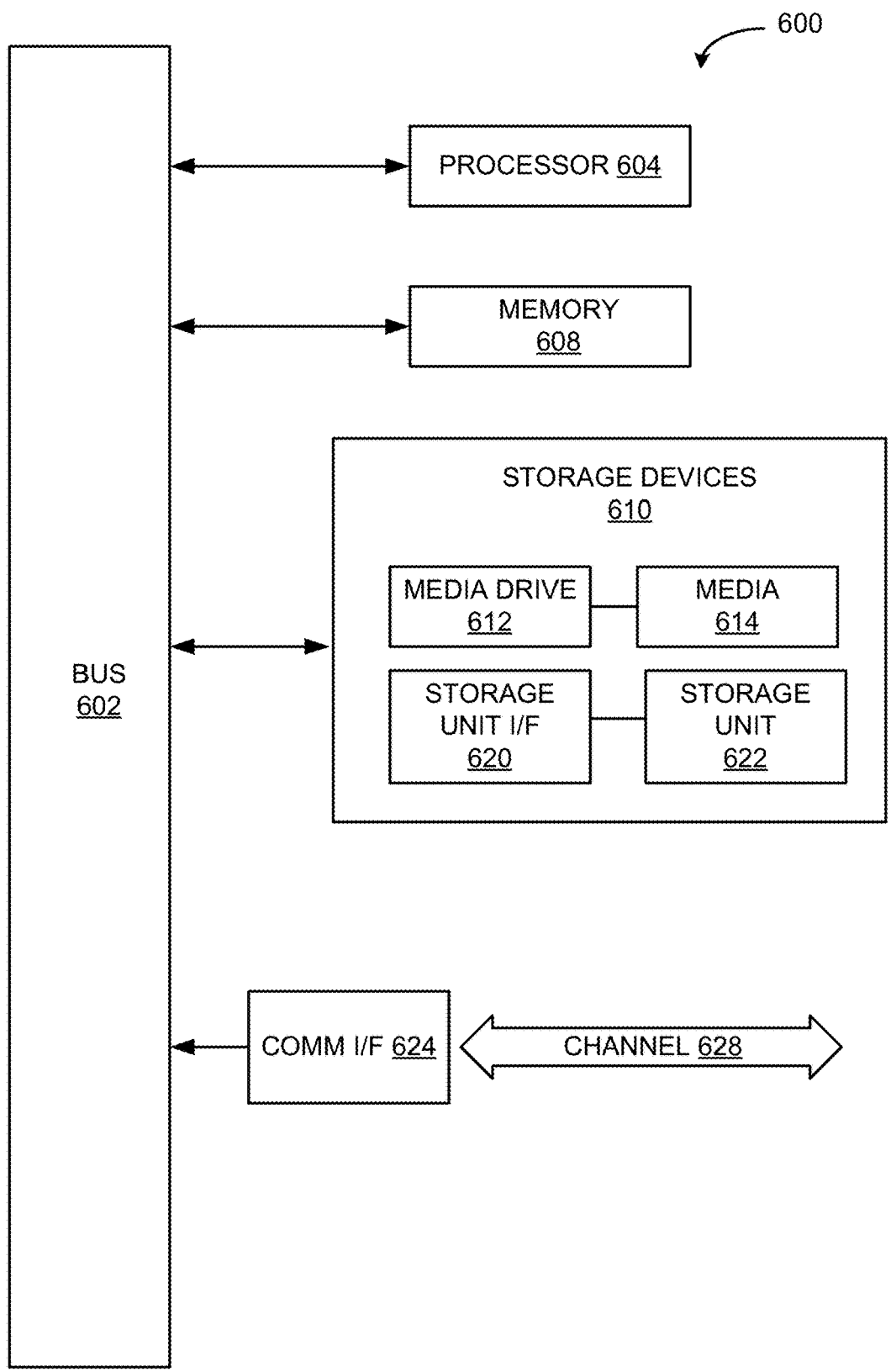
FIG. 4 is a schematic diagram of an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. This can include a processor, and/or any one or more of the components making up user device air-conditioning control device 24, air-conditioning system 10, etc. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid-state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of controlling operation of a vehicle heater, comprising:
    determining whether a vehicle's air-conditioning system is on;
    if the vehicle's air-conditioning system is on, determining whether an air-mix setting of the vehicle's air-conditioning system indicates a desire for maximum heat to be passed to the vehicle's cabin;
    if the air-mix setting indicates the desire for maximum heat to be passed to the vehicle's cabin, determining whether the vehicle's coolant temperature is below a coolant temperature threshold;
    if the vehicle's coolant temperature is below the coolant temperature threshold, determining whether an ambient temperature about the vehicle is below an ambient temperature threshold;
    if the ambient temperature is below the ambient temperature threshold, determining whether the vehicle is moving;
    if the vehicle is moving; determining whether the vehicle is carrying a load; and
    if the vehicle is carrying the load, activating the vehicle heater, wherein the load comprises towed load.

2. The method of claim 1, wherein determining whether the vehicle is carrying the load comprises at least one of sensing the presence of the towed load and determining that the vehicle is set to operate in a tow mode.

3. The method of claim 1, further comprising deactivating the vehicle heater if the vehicle's air-conditioning system is off.

4. The method of claim 1, further comprising deactivating the vehicle heater if the air-mix setting of the vehicles air-conditioning system does not indicate the desire for maximum heat to be passed to the vehicle's cabin.

5. The method of claim 1, further comprising deactivating the vehicle heater if the vehicle's coolant temperature is higher than the coolant temperature threshold.

6. The method of claim 1, further comprising deactivating the vehicle heater if the ambient temperature is higher than the ambient temperature threshold.

7. The method of claim 1, further comprising deactivating the vehicle heater if the vehicle is not moving.

8. The method of claim 1, further comprising deactivating the vehicle heater if the vehicle is not carrying the load.

9. The method of claim 1, wherein the deactivation of the vehicle heater comprises overriding a default mode of operation of the vehicle heater.

10. The method of claim 1, wherein the vehicle heater comprises at least one of a positive temperature coefficient (PTC) heater, a vehicle seat heater, a steering wheel heater, a defroster, and a secondary heating element.

11. An air-conditioning control device controlling an air-conditioning system of a vehicle, comprising:
    at least one processor;
    at least one memory operatively connected to the at least one processor, the at least one memory including computer code configured to cause the at least one processor to:
    receive from a plurality of vehicle sensors operatively connected to the air-conditioning control device and vehicle components, sensor data indicating operating conditions of the vehicle;

activate a heating element of the vehicle based on the sensor data, wherein the sensor data indicates that the air-conditioning system is on, a passenger of the vehicle is requesting maximum heat to be delivered to a cabin of the vehicle, coolant temperature does not exceed a coolant temperature threshold, ambient temperature does not exceed an ambient temperature threshold, the vehicle is moving, and the vehicle is towing a load.

12. The air-conditioning control device of claim 11, wherein the computer code further causes the at least one processor to deactivate the heating element if the vehicle is operating in accordance with one or more of the following operating conditions:
the air-conditioning system is off;
the passenger of the vehicle is not requesting maximum heat to be delivered to the cabin of the vehicle;
the coolant temperature exceeds the coolant temperature threshold;
the ambient temperature exceeds the ambient temperature threshold;
the vehicle is stationary; and
the vehicle is not towing the load.

13. The air-conditioning control device of claim 12, wherein the computer code causing the at least one processor to deactivate the heating element comprises computer code configured to cause the least one processor to override default operation of the heating element.

14. The air-conditioning control device of claim 11, wherein the computer code causing the at least one processor to activate the heating element comprises computer code configured to cause the least one processor to override default operation of the heating element.

15. The air-conditioning control device of claim 11, wherein the heating element comprises at least one of a positive temperature coefficient (PTC) heater, a vehicle seat heater, a steering wheel heater, a defroster, and a secondary heating element.

16. The air-conditioning control device of claim 11, wherein the coolant temperature threshold comprises a temperature of 45 degrees Celsius.

17. The air-conditioning control device of claim 11, wherein the ambient temperature threshold comprises a temperature of 5 degrees Celsius.

* * * * *